US007980735B1

(12) United States Patent
Wronski et al.

(10) Patent No.: US 7,980,735 B1
(45) Date of Patent: Jul. 19, 2011

(54) REFLECTOR ASSEMBLY FOR A RECESSED LUMINAIRE

(75) Inventors: Grzegorz Wronski, Peachtree City, GA (US); Lin Zhihong, Shanghai (CN)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 12/862,343

(22) Filed: Aug. 24, 2010

Related U.S. Application Data

(63) Continuation of application No. 12/114,969, filed on May 5, 2008, now Pat. No. 7,784,979.

(51) Int. Cl.
*F21V 15/01* (2006.01)
*F21V 7/10* (2006.01)
*G02B 5/09* (2006.01)
*G02B 7/182* (2006.01)

(52) U.S. Cl. ........ 362/364; 362/297; 362/346; 359/850; 359/855

(58) Field of Classification Search .................. 362/147, 362/364, 346, 296.01, 217.05, 247, 241, 362/297, 306, 341; 359/846, 847, 848, 849, 359/850, 851, 853, 855, 871
See application file for complete search history.

(56) References Cited

U.S. PATENT DOCUMENTS 3,170,635 A 2/1965 Curtain
3,321,615 A 5/1967 Hy
3,420,995 A 1/1969 Dunckel
3,582,643 A 6/1971 Heise
3,609,346 A 9/1971 Lund et al.
4,048,491 A 9/1977 Wessman
4,165,529 A 8/1979 Hagelthorn
4,511,113 A 4/1985 Druffel et al.
4,713,916 A 12/1987 Brooks
4,796,169 A 1/1989 Shemitz
5,222,800 A 6/1993 Chan et al.
5,287,259 A 2/1994 Lautzenheiser
5,374,812 A 12/1994 Chan et al.
5,379,199 A 1/1995 Hirshenhorn
5,452,816 A 9/1995 Chan et al.
5,457,617 A 10/1995 Chan et al.
5,597,234 A 1/1997 Winkelhake
5,662,414 A 9/1997 Jennings et al.
5,738,436 A 4/1998 Cummings et al.
5,746,507 A 5/1998 Lee
5,758,959 A 6/1998 Sieczkowski
5,803,571 A 9/1998 McEntyre et al.
5,857,766 A 1/1999 Sieczkowski
5,915,828 A 6/1999 Buckley
5,957,573 A 9/1999 Wedekind et al.
(Continued)

*Primary Examiner* — Jong-Suk (James) Lee
*Assistant Examiner* — David R Crowe
(74) *Attorney, Agent, or Firm* — King & Spalding LLP

(57) ABSTRACT

A reflector assembly includes a frame that maintains the integrity and shape of a multi-member reflector for a recessed luminaire. The members of the reflector are arranged in a geometric form, such as a rectangle. The frame is disposed around the reflector. The frame includes at least one integral member manipulated around a joint formed between adjacent members of the reflector. For example, the integral member can include a clamp or tab. The frame and the integral member secure the positions of the members of the reflector relative to one another and prevent light from leaking through joints between the members. One or more connectors are coupled to the frame for connecting the reflector assembly to a lighting fixture. For example, each connector can include a torsion spring coupled to a lever configured to engage a corresponding catch of a collar on the lighting fixture.

20 Claims, 15 Drawing Sheets

U.S. PATENT DOCUMENTS

| | | | | |
|---|---|---|---|---|
| 5,957,574 | A | 9/1999 | Hentz et al. | |
| 5,964,523 | A | 10/1999 | Eversberg | |
| 6,030,102 | A | 2/2000 | Gromotka | |
| 6,082,878 | A | 7/2000 | Doubek et al. | |
| 6,164,802 | A | 12/2000 | Gromotka | |
| 6,206,544 | B1 | 3/2001 | Costa | |
| 6,354,717 | B1 * | 3/2002 | Wang | 362/297 |
| 6,431,723 | B1 | 8/2002 | Schubert et al. | |
| 6,461,016 | B1 | 10/2002 | Jamison et al. | |
| 6,464,378 | B1 * | 10/2002 | Reed et al. | 362/320 |
| 6,609,690 | B1 | 8/2003 | Davis | |
| 6,652,124 | B2 | 11/2003 | Schubert et al. | |
| 6,726,347 | B2 | 4/2004 | Wronski | |
| 7,213,948 | B2 | 5/2007 | Hein | |
| 7,722,208 | B1 * | 5/2010 | Dupre et al. | 362/147 |
| 7,735,795 | B2 | 6/2010 | Wronski | |
| 7,784,979 | B2 | 8/2010 | Wronski et al. | |
| 2005/0168986 | A1 | 8/2005 | Wegner | |
| 2005/0183344 | A1 | 8/2005 | Ziobro et al. | |
| 2005/0230589 | A1 | 10/2005 | Wronski | |
| 2005/0247842 | A1 | 11/2005 | Wronski | |
| 2007/0075206 | A1 | 4/2007 | Wright et al. | |
| 2007/0097693 | A1 | 5/2007 | Klose | |
| 2007/0211470 | A1 | 9/2007 | Huang | |
| 2007/0261881 | A1 | 11/2007 | Wronski | |
| 2007/0268707 | A1 * | 11/2007 | Smester | 362/362 |
| 2008/0025031 | A1 | 1/2008 | Wronski et al. | |
| 2008/0130298 | A1 | 6/2008 | Negley et al. | |
| 2008/0192490 | A1 * | 8/2008 | Brown et al. | 362/365 |
| 2009/0175040 | A1 | 7/2009 | Green et al. | |
| 2009/0273938 | A1 | 11/2009 | Wronski et al. | |

* cited by examiner

117

917

1117

REFLECTOR ASSEMBLY FOR A RECESSED LUMINAIRE

RELATED APPLICATION

This application is a continuation of U.S. patent application Ser. No. 12/114,969, titled "Reflector Assembly for a Recessed Luminaire," filed on May 5, 2008, now U.S. Pat. No. 7,784,979 which is related to co-pending U.S. patent application Ser. No. 11/809,785, titled "Surface-Mounted Lighting Fixture," filed Jun. 1, 2007. The complete disclosures of each of the foregoing related applications are hereby fully incorporated herein by reference.

TECHNICAL FIELD

The invention relates generally to recessed luminaires, and more particularly, to maintaining the integrity and shape of a multi-member reflector of a recessed luminaire.

BACKGROUND

A luminaire is a system for producing, controlling, and/or distributing light for illumination. For example, a luminaire can include a system that outputs or distributes light into an environment, thereby allowing certain items in that environment to be visible. Luminaires are sometimes referred to as "light fixtures".

A recessed lighting fixture is a light fixture that is installed in a hollow opening in a ceiling or other surface. A typical recessed lighting fixture includes a platform attached to a ceiling or wall structure, a reflector mounted to the platform, and a lamp socket coupled to the reflector. For example, the lamp socket can be mounted directly to the reflector and/or platform. Alternatively, the lamp socket can be mounted to an upper reflector, which can be mounted to the reflector and/or platform. The lamp socket is configured to receive a light-emitting element, such as a lamp, light-emitting diode (LED), or bulb. For simplicity, the term "lamp" is used herein to refer to any light-emitting element.

The reflector can include a single member or multiple members that are joined together at one or more joints. For example, the joints can be riveted or spot welded together. Riveting, spot welding, and other traditional methods of joining members of a multi-member reflector are unsatisfactory. Such methods typically result in poor structural integrity of the reflector. For example, traditional multi-member reflectors include one or more gaps at the joints of the members. These gaps can allow light to leak between the members, decreasing the efficiency and aesthetic value of the lighting fixture. In addition, the gaps can compromise the geometry of the reflectors. For example, large gaps can cause a "square"-shaped reflector to have a non-square geometry, thereby changing the intended effect of the reflector to the light from the light-emitting element. Moreover, spot welding may cause deformation or degradation of a surface of the reflector.

Therefore, a need exists in the art for a system and method for maintaining the integrity and shape of a reflector of a recessed luminaire. In particular, a need exists in the art for maintaining the integrity and shape of a multi-member reflector of a recessed luminaire.

SUMMARY

The invention provides a system and method for maintaining the integrity and shape of a multi-member reflector for a recessed luminaire. In particular, the invention provides a reflector assembly having a frame configured to maintain the integrity and shape of the multi-member reflector of the reflector assembly. The members of the reflector can be arranged in a geometric form, such as an oblong, oval, rectangular, circular, hexagonal, triangular, or any other geometric form.

The frame can be disposed around all or a portion of the reflector and can include one or more integral members configured to be manipulated around joints formed between adjacent members of the reflector. For example, each integral member can include a protrusion from an edge of the reflector, such as a clamp or a tab. Alternatively, the members of the reflector can include one or more integral tabs configured to be manipulated around the joints. For example, each integral tab can include a protrusion from an edge of the reflector member, which may be manipulated around an outside edge of the frame. The frame and the integral member(s) can be configured to secure the positions of the members relative to one another and to prevent light from leaking through joints between each of the members.

One or more connectors can be integral to the frame or coupled to the frame for connecting the reflector assembly to a lighting fixture. For example, each connector can include a biasing member, such as a torsion spring, that includes a lever. The lever can be configured to engage a corresponding catch of a collar on the lighting fixture.

These and other aspects, features and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more complete understanding of the present invention and the advantages thereof, reference is now made to the following description, in conjunction with the accompanying figures briefly described as follows.

DETAILED DESCRIPTION OF EXEMPLARY EMBODIMENTS

The following description of exemplary embodiments refers to the attached drawings, in which like numerals indicate like elements throughout the several figures.

Figure 1:
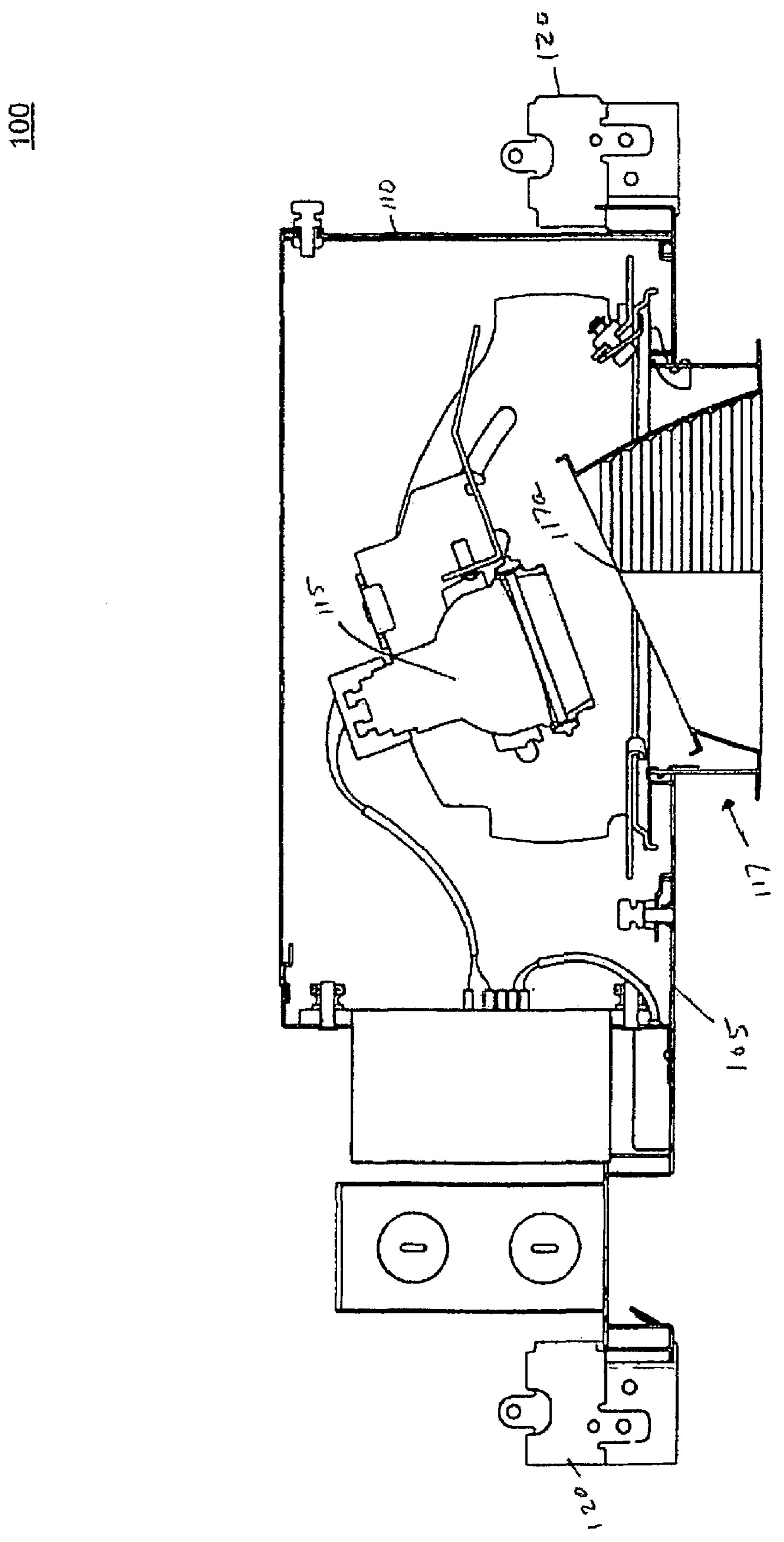
FIG. 1 is an elevational cross-sectional side view of a lighting fixture, in accordance with certain exemplary embodiments.

FIG. 1 is an elevational cross-sectional side view of a lighting fixture 100, in accordance with certain exemplary embodiments. The lighting fixture 100 includes a platform 105, a housing 110, a lamp 115, a reflector assembly 117, and one or more hanger bars 120 configured to be installed in a hollow opening in a ceiling (not shown) or other surface (not shown). For example, the lighting fixture 100 may be installed overhead, with a substantial portion of the lighting fixture 100 being disposed within a ceiling of a house, an office building, or like structure.

Each hanger bar 120 is configured to be fastened to a ceiling or wall support or joist. In certain exemplary embodiments, each hanger bar 120 can include an integral fastener for attaching the hanger bar 120 to the support or joist, substantially as described in co-pending U.S. patent application Ser. No. 10/090,654, entitled "Hanger Bar for Recessed Luminaires with Integral Nail," the complete disclosure of which is hereby fully incorporated herein by reference. The platform 105 extends substantially between the hanger bars 110.

Figure 2:
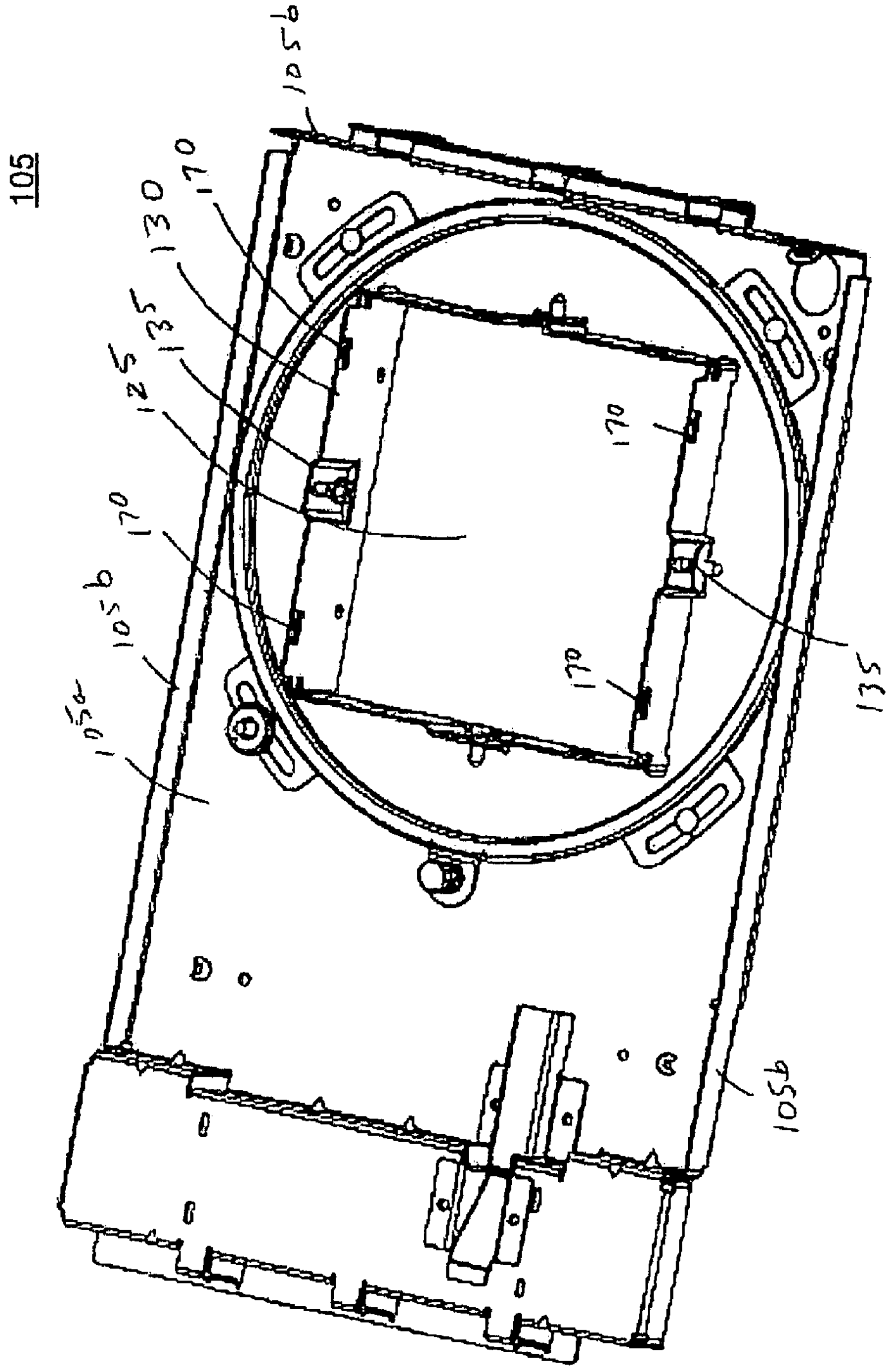
FIG. 2 is a perspective top view of a platform of the lighting fixture of FIG. 1, in accordance with certain exemplary embodiments.

FIG. 2 is a perspective top view of the platform 105, in accordance with certain exemplary embodiments. With reference to FIGS. 1 and 2, the platform 105 includes a generally rectangular, flat plate **105*a* with upturned edges 105*b*. The flat plate 105*a*** can be constructed from any material, including, but not limited to, a galvanized plaster steel.

The platform 105 includes an aperture 125 through which light from the lamp 115 can pass. Although depicted in FIGS. 1 and 2 to have a square form, the aperture 125 can have any geometric form, including, but not limited to, an oblong, oval, rectangular, circular, hexagonal, triangular, or other geometric form. A collar 130 frames at least a portion of the aperture 125. In certain exemplary embodiments, the collar 130 includes one or more members extending substantially perpendicularly from the flat plate **105*a*, around the aperture 125. For example, when the lighting fixture 100 (FIG. 1) is installed in a ceiling, the collar 130** may extend upward, into the ceiling.

Figure 3:
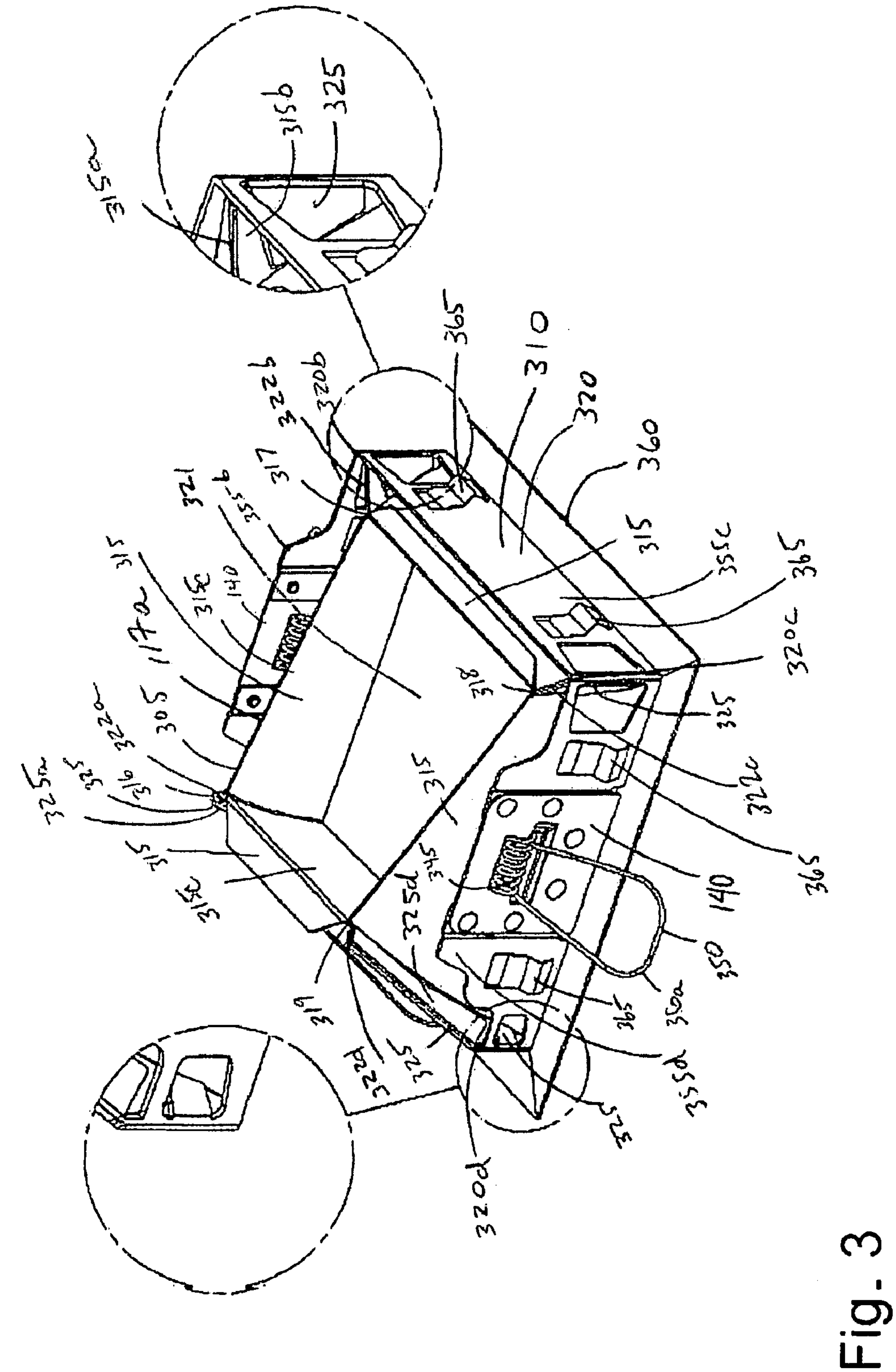
FIG. 3 is a perspective side view of a reflector assembly of the lighting fixture of FIG. 1, in accordance with certain exemplary embodiments.
Figure 4:
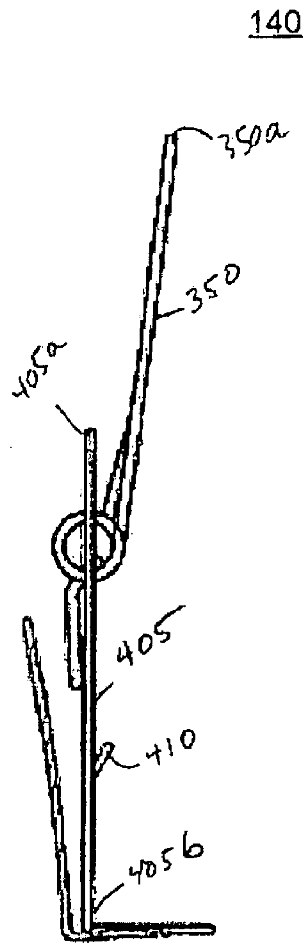
FIG. 4 is an elevational side view of a connector of the reflector assembly of FIG. 3, in accordance with certain exemplary embodiments.
Figure 5:
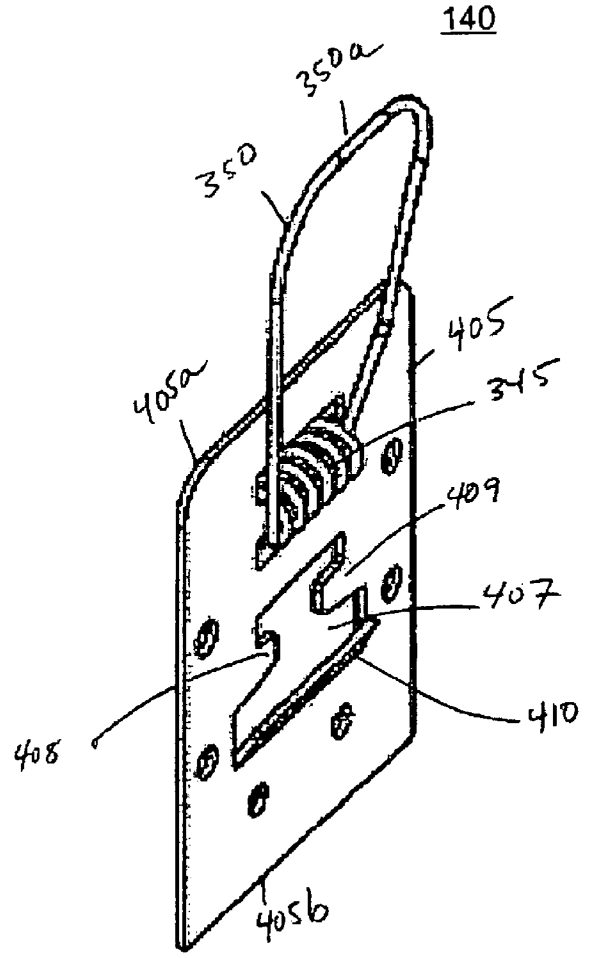
FIG. 5 is a perspective side view of the connector of FIG. 4, in accordance with certain exemplary embodiments.
Figure 6:
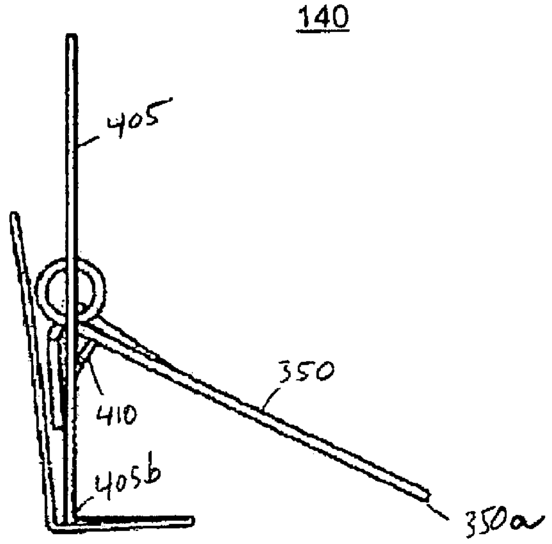
FIG. 6 is an elevational side view of the connector of FIG. 4, in accordance with certain exemplary embodiments.
Figure 7:
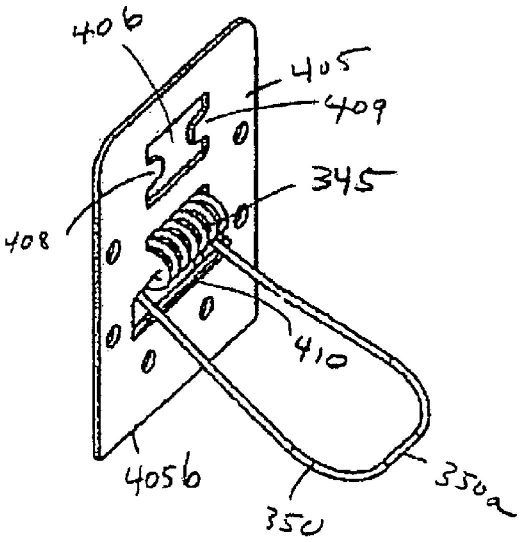
FIG. 7 is a perspective side view of the connector of FIG. 4, in accordance with certain exemplary embodiments.

The collar 130 includes one or more catches 135 configured to engage corresponding connectors 140 of FIG. 3 on the reflector assembly 117. The reflector assembly 117 is configured to direct, enhance, and focus light from the lamp 115 through the aperture 125. Typically, the reflector assembly 117 has a profile that corresponds to the geometric form of the aperture 125. For example, a person can install the reflector assembly 117 in the lighting fixture 100 by sliding a top end **117*a* of the reflector assembly 117 into the aperture 125 and securing each connector 140 (of FIG. 3) to its corresponding catch 135. The reflector assembly 117 is described in greater detail hereinafter with reference to FIG. 3**.

FIG. 3 is a perspective side view of the reflector assembly 117, in accordance with certain exemplary embodiments. The reflector assembly 117 includes a reflector 305 and a bracket assembly 310 disposed substantially about the reflector 305. The reflector 305 includes multiple members 315 joined together at joints 316-319.

Each of the members 315 comprises a reflective material, such as extruded metal, sheet metal, or die-cast metal. In certain exemplary embodiments, one or more of the members 315 can include a protective coating, such as an anodized layer of material. Each member 315 includes a first end segment **315*a* and a second end segment 315*b* disposed on opposing sides of a central segment 315*c*. The first end segment 315*a* of one member is positioned substantially adjacent to the second end segment 315*b* of another member 315, converging at the joints 316-319**.

The members 315 are disposed around a light dispersion region 321. One side of each central segment **315*c* is visible from within the light dispersion region 321. Each end segment 315*a* and 315*b* extends from its corresponding central segment 315, in a direction away from the light dispersion region 321. Thus, each pair of the end segments 315*a* and 315*b* essentially creates a "wing" 322*a*-322*d* that extends outward from the light dispersion region 321 and generally towards the bracket assembly 310. The end segments 315*a* and 315*b* and their corresponding wings 322*a*-322*d* are generally not visible from within the light dispersion region 321**.

The bracket assembly 310 includes a frame 320 and the connectors 140. The frame 320 can be formed as a single member, with no joints, or by joining together multiple members at one or more joints. The frame 320 includes side segments **355*b*-355*d* disposed about at least a portion of the members 315 of the reflector 305. Each corner 320*b*-320*d* of the frame 320 includes at least one clamp 325 configured to be compressed around at least a portion of a corresponding one of the wings 322*a*-322*d*. For example, each clamp 325 can include a substantially "V"-shaped member configured to be compressed around its corresponding portion of a wing 322*a*-322*d*. In certain exemplary embodiments, the clamp 325 is integral with its corresponding corner 320*b*-320*d***.

In addition to securing the bracket assembly 310 to the reflector 305, the clamps 325 and the segments **355*b*-355*d* provide structural integrity to the reflector 305. For example, the clamps 325 and the segments 355*b*-355*d* secure the end segments 315*a* and 315*b* at the joints 322*a*-322*d* of the reflector 305, thereby maintaining a geometrical relationship between the members 315. In addition, the clamps 325 prevent light from leaking out from the light dispersion region 321 along the joints 322*a*-322*d*. For example, by providing clamps 325*a* and 325*d* that extend along a significant portion of the joint 322*a*-322*d*, the clamps 325*a* and 325*d* can prevent gaps between the members 315 and also can reflect light transmitted through any such gaps back into the light dispersion region 321**.

Each connector 140 includes a biasing member, such as a torsion spring 345, having a lever 350. FIGS. 4-7 illustrate the connector 140, in accordance with certain exemplary embodiments. With reference to FIGS. 4-7, the connector 140 includes a generally elongated body member 405 having a top end 405*a* and a bottom end 405*b*. Two apertures 406 and 407 are disposed within the body member 405, with mounting tabs 408 and 409 being disposed on opposite sides of each aperture 406 and 407. The aperture 406 is disposed proximate the top end 405*a* of the body member 405, and the aperture 407 is disposed proximate the bottom end 405*b* of the body member 405.

The torsion spring 345 can be installed within one of the apertures 406 and 407. Ends of the torsion spring 345 can be disposed about the mounting tabs 408 and 409. For example, the torsion spring 345 can be installed within the aperture 406 when the lighting fixture 100 of FIG. 1 is installed in a relatively thick ceiling. Similarly, the torsion spring 345 can be installed within the aperture 407 when the lighting fixture 100 is installed in a ceiling having an average thickness. While the exemplary embodiment depicted in FIGS. 4-7 includes two apertures 406 and 407 in the body member 405, the body member 405 can include one or more apertures or the torsion spring 345 can be coupled to the body member 405 by other means known in the art.

With reference to FIGS. 3-7, actuation of the lever 350 relative to the reflector 305 can energize the torsion spring 345. For example, actuation of the lever 350 upwards, so that an end 350*a* of the lever 350 moves towards the top end of the reflector assembly 117*a* can energize the torsion spring 345. Similar actuation of the lever 350 in the opposite direction can release energy within the torsion spring 345. In certain exemplary embodiments, a resting tab 410 extends angularly from the body member 405 of the connector 140. The resting tab 410 is configured to prevent the lever 350 of the torsion spring 345 from impacting a flange 360 of the reflector 305. For example, the flange 360 can include a trim of the lighting fixture 100 of FIG. 1.

In certain alternative exemplary embodiments, one or more of the connectors 140 can be integral to the frame 320. For example, apertures 406 and 407 of the connectors 140 can be formed in side members of the frame 320 such that each biasing member 345 of the connectors 140 extends between mounting tabs integral to the frame 320. Each of the connectors 140 may include a resting tab integral to the frame 320, similar to the resting tab 410 described above. In additional alternative exemplary embodiments, the reflector assembly 117 may not include connectors 140.

With reference to FIGS. 1-3, an operator can install the reflector assembly 117 within the lighting fixture 100 by sliding the top end 117*a* of the reflector assembly 117 into the aperture 125 and securing each connector 140 to its corresponding catch 135. Specifically, the operator can actuate each lever 350 upwards to energize its corresponding torsion spring 345. Once the reflector assembly 117 is positioned correctly within the aperture 125, the operator can mount the reflector assembly 117 within the lighting fixture 100 by releasing the levers 350. This releasing movement can cause the torsion springs 345 to actuate the levers 350 downward, such that each lever 350 engages its corresponding catch 135. For example, each catch 135 can include a notch (not shown) configured to receive at least a portion of the end 350*a* of the corresponding lever 350.

In certain exemplary embodiments, adjustment tabs 365 disposed about the frame 320 can help ensure proper alignment of the reflector assembly 117 within the lighting fixture 100. For example, each adjustment tab 365 can include a clip, as illustrated in FIG. 3. Each adjustment tab 365 is configured to engage a corresponding notch 170 in the collar 130 of the platform 105 of the lighting fixture.

Figure 8:
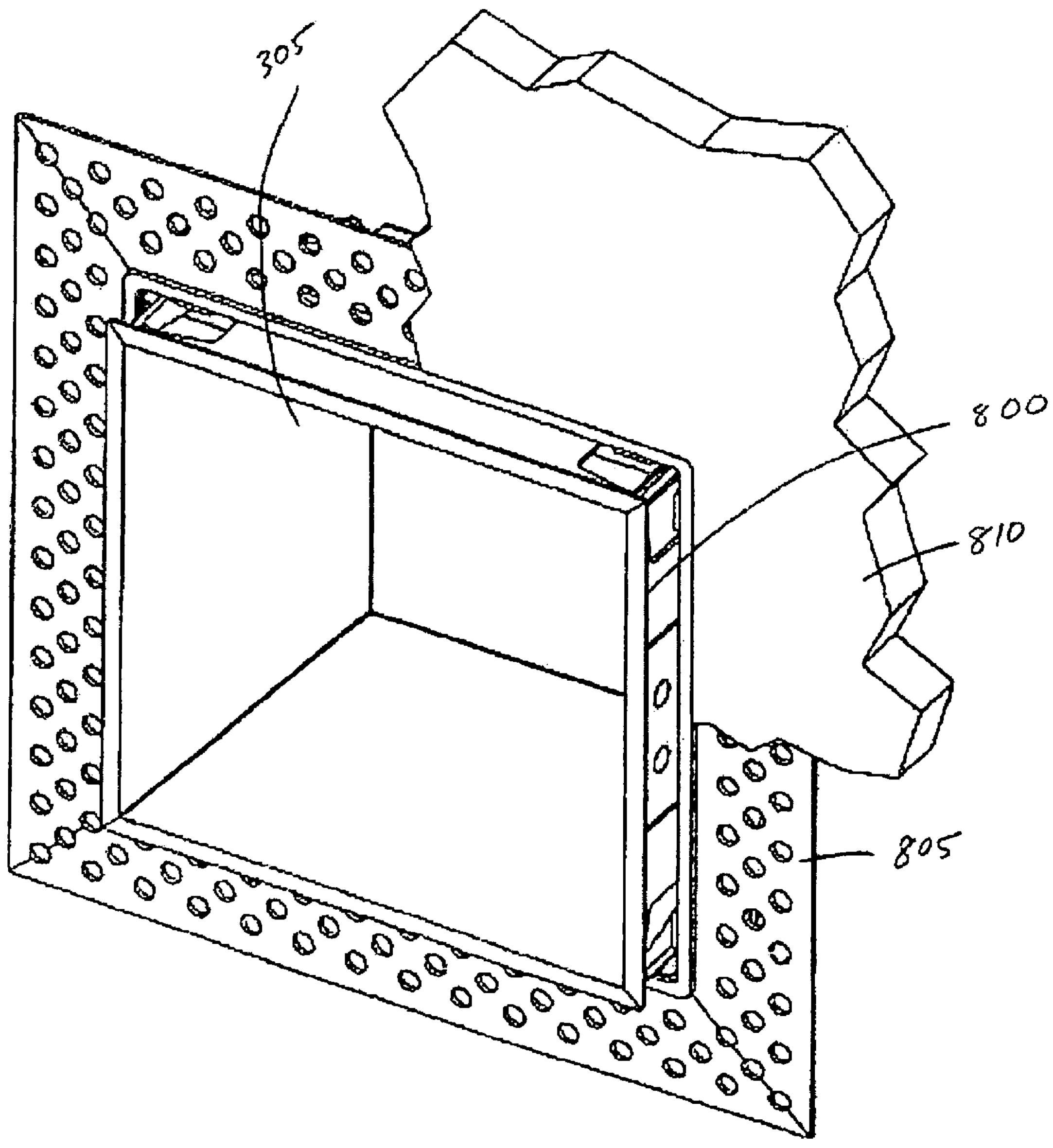
FIG. 8 is a perspective side view of a trim-less application of the reflector assembly of FIG. 3, in accordance with certain alternative exemplary embodiments.

Although FIG. 3 illustrates two adjustment tabs 365 disposed on each side of the frame 320, a person of ordinary skill in the art having the benefit of the present disclosure will recognize that any number of adjustment tabs 365 may be utilized on one or more sides of the frame 320 in certain alternative embodiments. Similarly, sizing, configuration, and position of each adjustment tab 365 can vary depending on the lighting application. For example, if the reflector assembly 117 includes a metal trim, such as a die-cast metal trim, the metal trim can include one or more vertical protrusions instead of the clips 365 depicted in FIG. 3. Similarly, as illustrated in FIG. 8, the adjustment tabs 365 may not be included within the frame 320 in a trim-less application of the reflector assembly 117. For example, instead of adjustment tabs 365, the trim-less application can nest a lip 800 of the reflector 305 into a rimless frame 805 bonded with ceiling finishing material 810. In this alternative exemplary embodiment, the ceiling finishing material 810 can maintain alignment of the reflector assembly 117.

Figure 9:
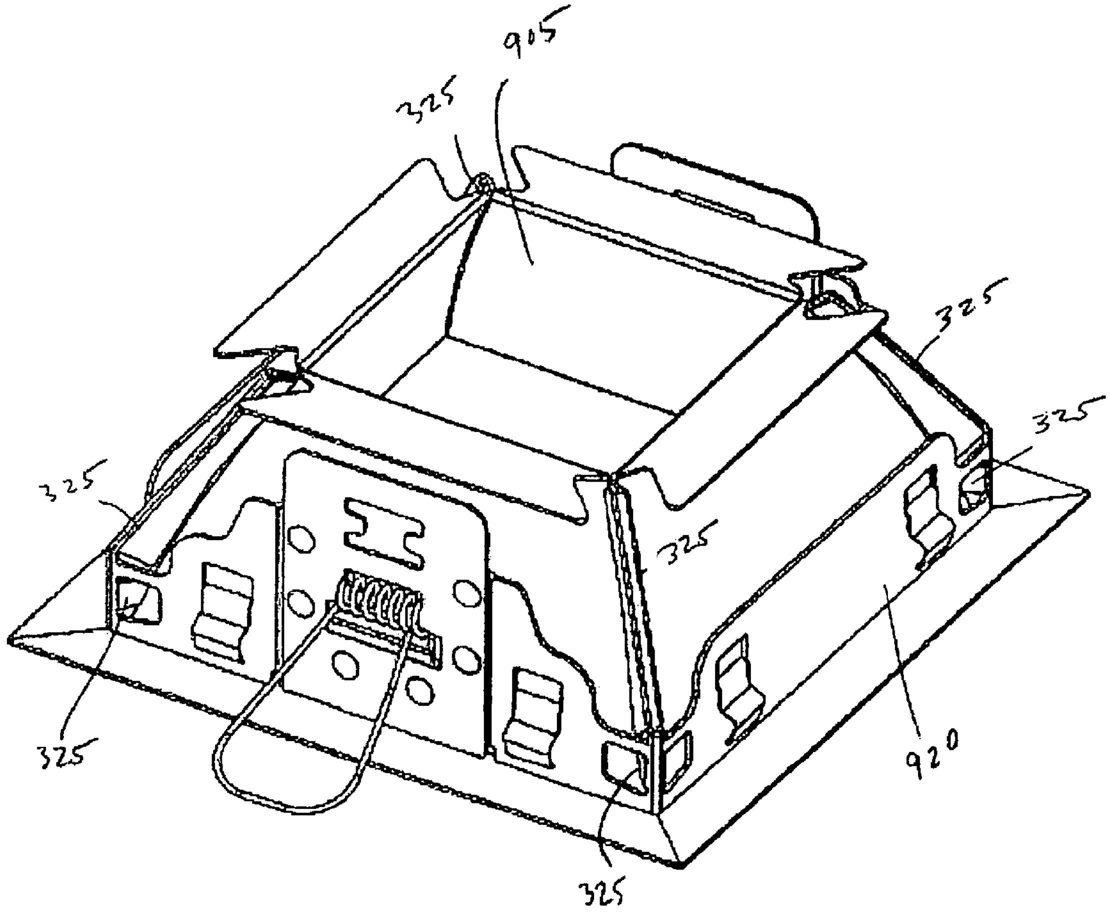
FIG. 9 is a perspective side view of another reflector assembly, in accordance with certain alternative exemplary embodiments.
Figure 10:
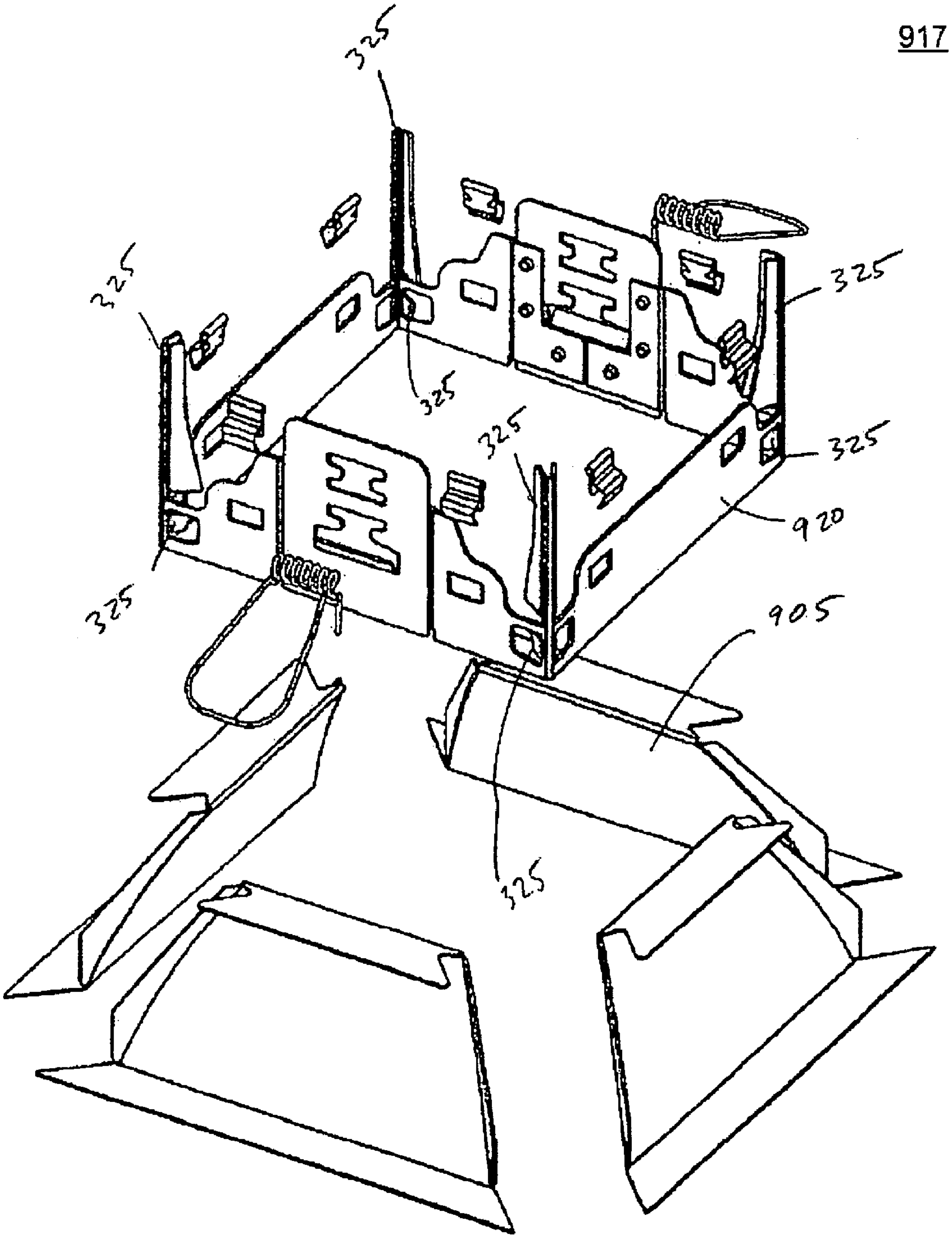
FIG. 10 is a perspective exploded side view of the alternative reflector assembly of FIG. 9, in accordance with certain alternative exemplary embodiments.
Figure 11:
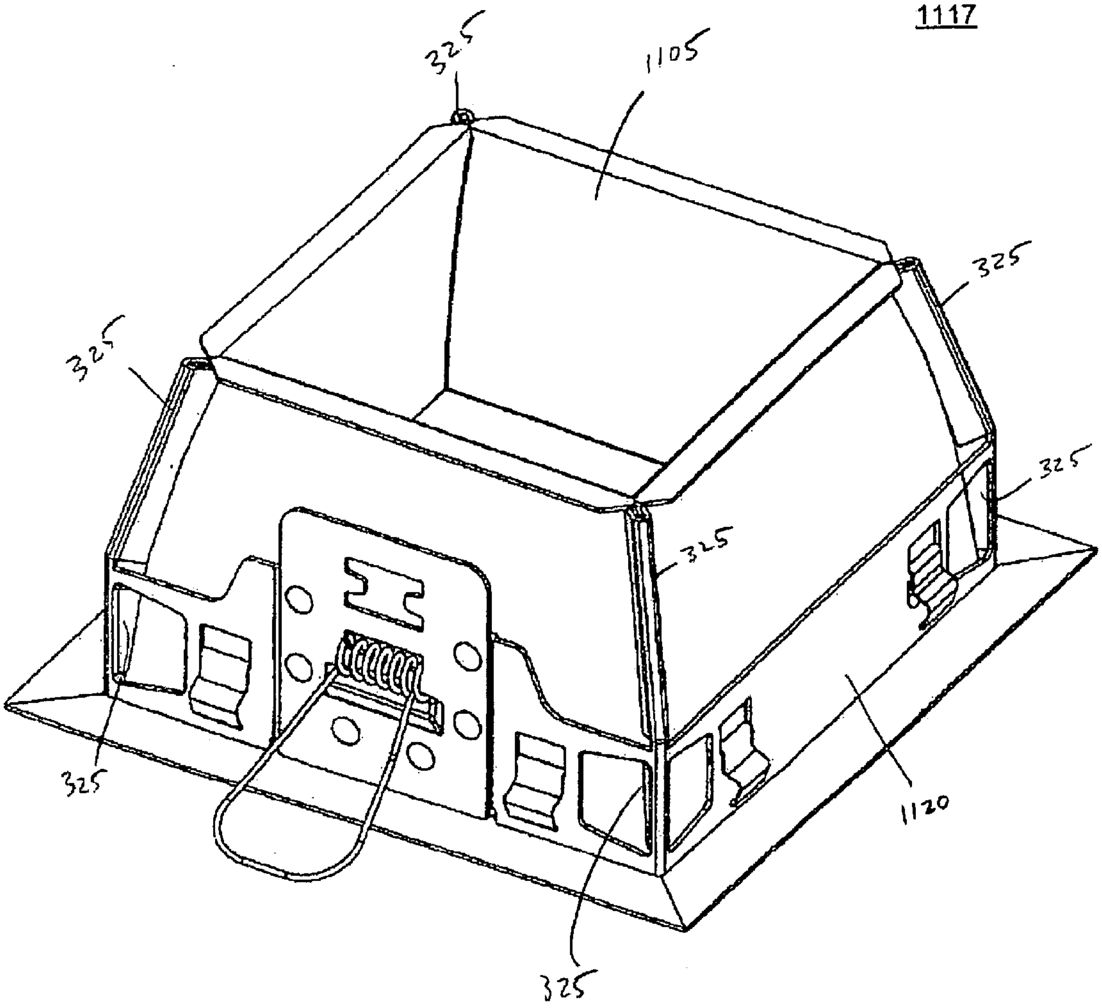
FIG. 11 is a perspective side view of yet another reflector assembly, in accordance with certain alternative exemplary embodiments.

Although illustrated in FIG. 3 as having an "angle cut" geometry, the reflector 305 may have one of many other suitable geometries in certain alternative exemplary embodiments. For example, FIGS. 9 and 10 illustrate a reflector assembly 917 with a reflector 905 having a "short square" geometry, according to certain alternative exemplary embodiments. Similarly, FIG. 11 illustrates a reflector assembly 1117 with a reflector 1105 having a "tall square" geometry, according to certain alternative exemplary embodiments. Aside from the different geometries of the reflectors 905 and 1105 in these reflector assemblies 917 and 1117, respectively, the reflector assemblies 917 and 1117 are substantially identical to the reflector assembly 117 (of FIG. 3) described previously. Integral clamps 325 of frames 920 and 1120 of the reflector assemblies 917 and 1117, respectively, may have different sizes and configurations than the integral clamps 325 of the reflector assembly 117, to accommodate the different geometries of the reflector assemblies 917 and 1117.

Figure 12:
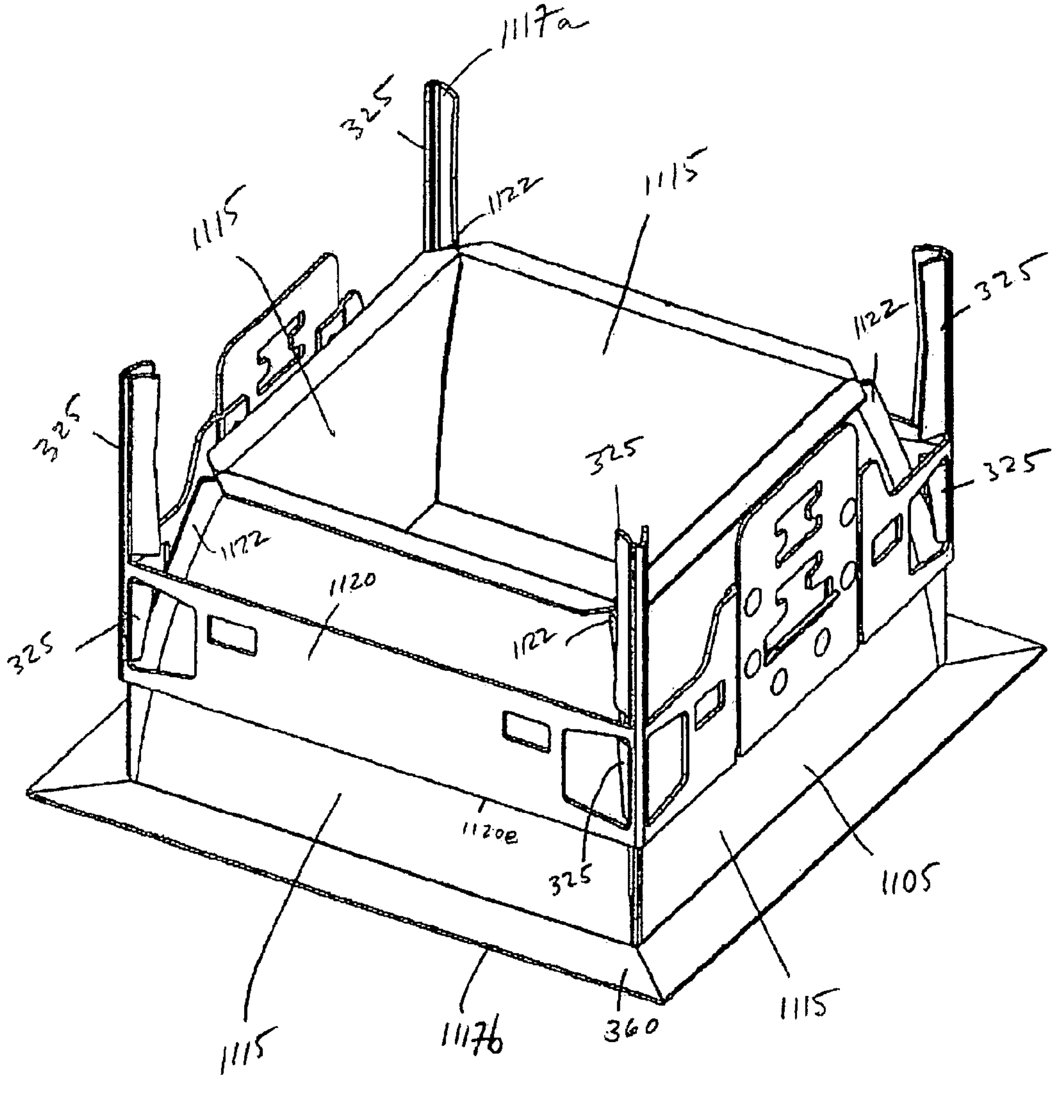
FIG. 12 is a perspective side view of the alternative reflector assembly of FIG. 11, during a first stage of assembly thereof, in accordance with certain exemplary embodiments.
Figure 13:
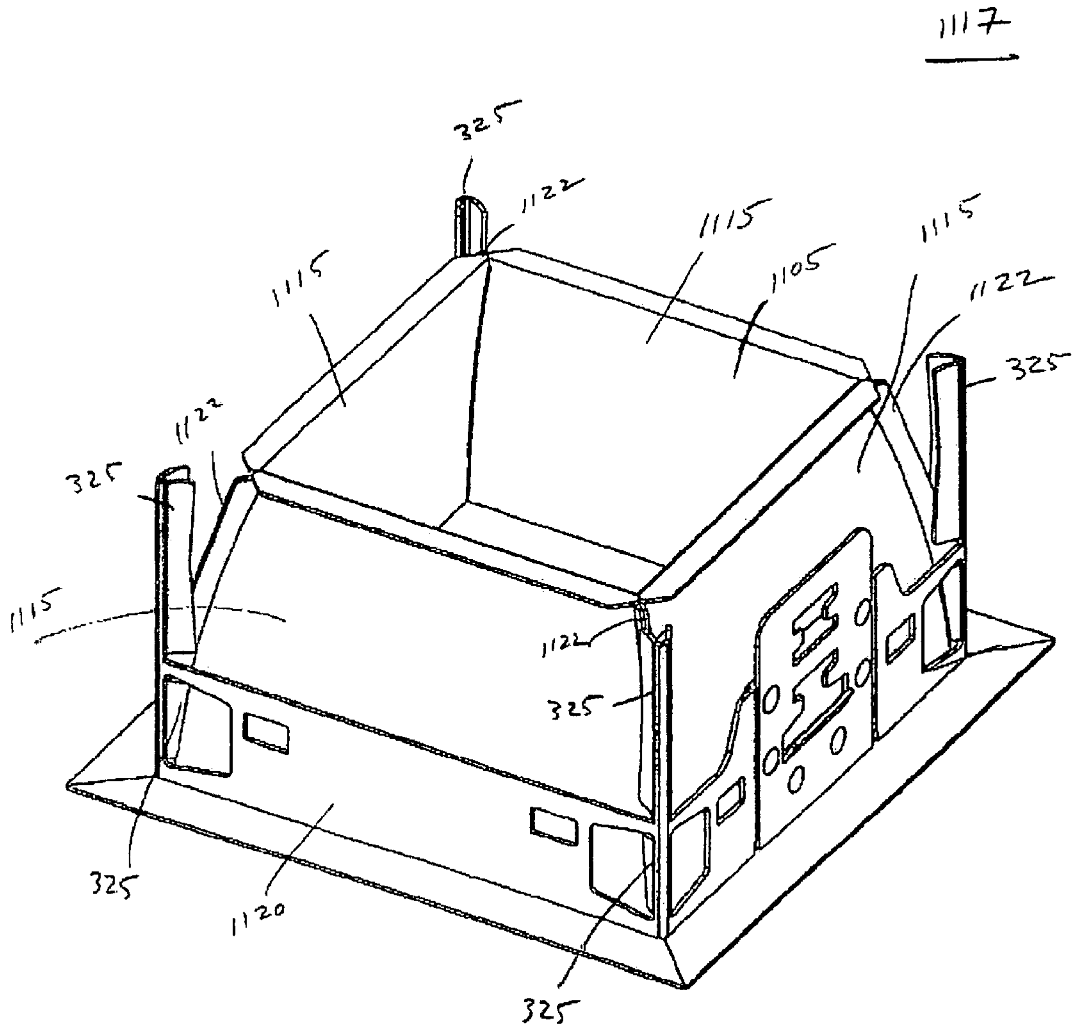
FIG. 13 is a perspective side view of the alternative reflector assembly of FIG. 11, during a second stage of assembly thereof, in accordance with certain exemplary embodiments.
Figure 14:
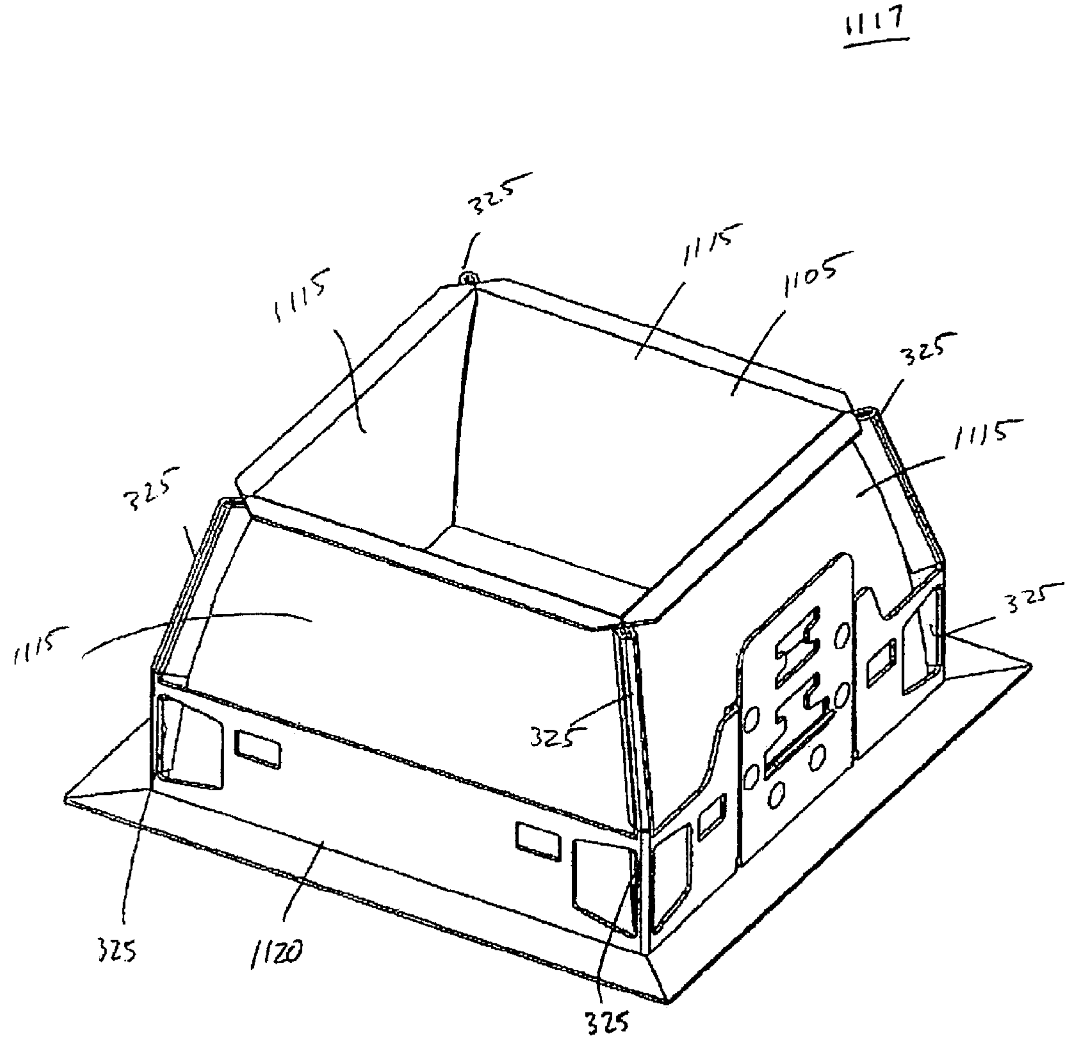
FIG. 14 is a perspective side view of the alternative reflector assembly of FIG. 11, in an assembled state, in accordance with certain exemplary embodiments.

FIGS. 12-14 illustrate a method of manufacturing the reflector assembly 1117, in accordance with certain exemplary embodiments. Referring to FIGS. 12-14, the members 1115 of the reflector 1105 of the reflector assembly 1117 are aligned with one another so that a proper geometrical relationship exists between the members 1115. For example, in certain exemplary embodiments, the geometric relationship can be a square that is made up of four members 1115. In certain exemplary embodiments, the members 1115 may include a protective coating, such as an anodized layer of material. For example, the protective coating may be applied to the members 1115 before the members 1115 are aligned for assembly.

As illustrated in FIG. 12, the frame 1120 of the reflector assembly 1117 is aligned with the members 1115. For example, the frame 1120 can slide around the members 1115, from a top end 1117*a* of the reflector assembly 1117 towards a bottom end 1117*b* of the reflector assembly 1117*b*. In certain exemplary embodiments, the frame 1120 rests proximate the bottom end 1117*b* of the reflector assembly 1117, with a bottom edge 1120*e* of the frame 1120 being disposed proximate a flange 360 of the reflector 1105, as illustrated in FIG. 13. The frame 1120 is secured to the reflector 1105 by compressing each of one or more integral clamps 325 of the frame 1120 around at least a portion of a corresponding wing 1122 (of FIGS. 12 and 13) of the reflector 1105, as illustrated in FIG. 14. Although the method associated with FIGS. 12-14 relates to a reflector assembly 1117 having a tall square geometry, a person of ordinary skill in the art having the benefit of the present disclosure will recognize that the method may be used to assemble assemblies having other shapes, such as the assemblies 117 and 917 described previously.

Figure 15:
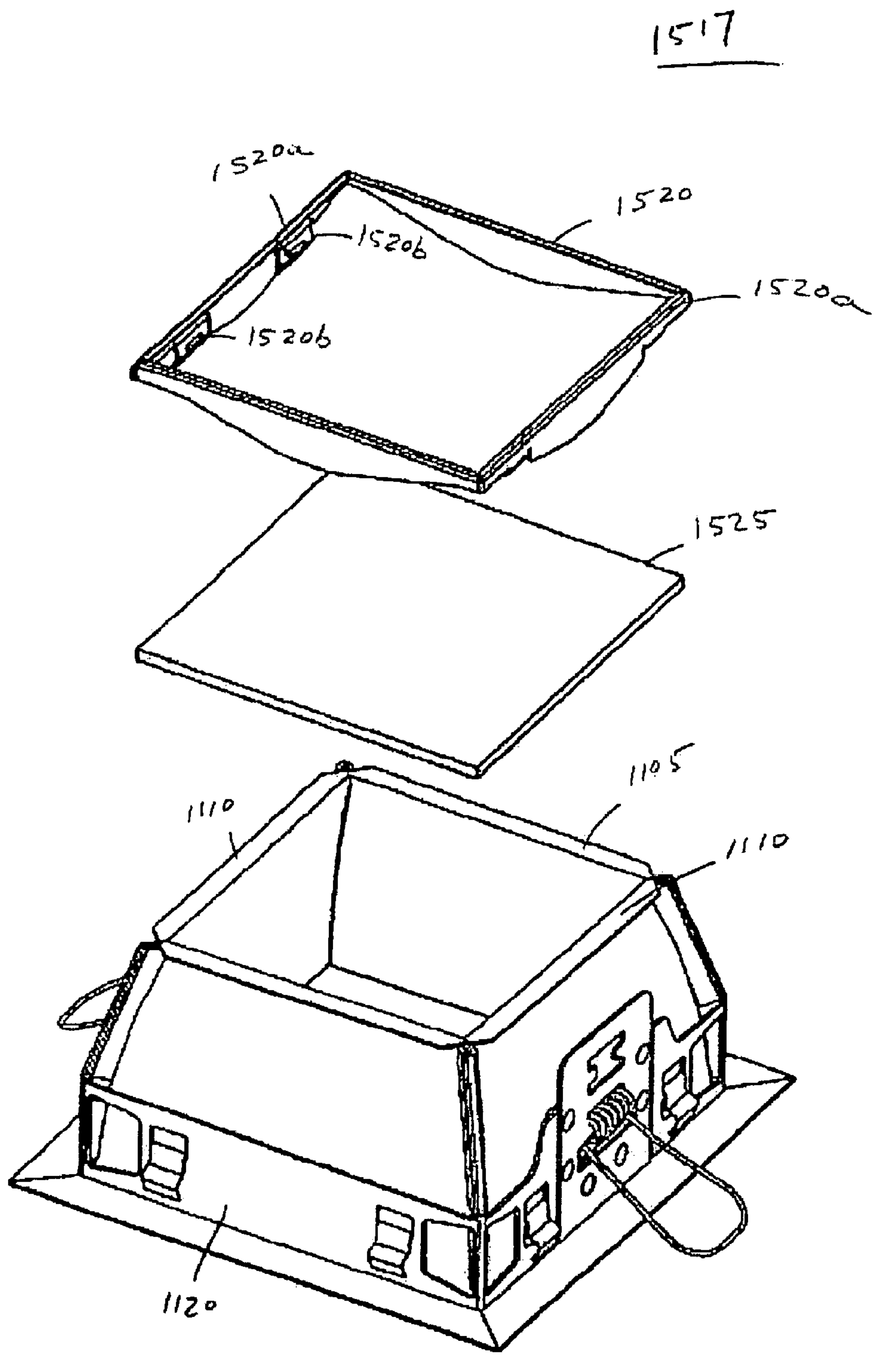
FIG. 15 is a perspective, partially exploded, side view of yet another reflector assembly, in accordance with certain alternative exemplary embodiments.

FIG. 15 is a perspective exploded view of a reflector assembly 1517, in accordance with certain alternative exemplary embodiments. The reflector assembly 1517 includes a reflector 1105 and a frame 1120 that are substantially identical to the reflector 1105 and frame 1120, respectively, of the reflector assembly 1117 of FIG. 11. In addition, the reflector assembly 1517 includes a lens frame 1520 and lens 1525. Edges 1520*a* of the lens frame 1520 include one or more clips 1520*b* configured to engage corresponding tabs 1110 disposed proximate a top end of the reflector 1105. For example, the exemplary lens frame 1520 can be configured to be removably coupled to the reflector 1105 by way of the clips 1520*b* and tabs 1110.

The lens 1525 includes a transparent or semi-transparent member having a profile that substantially corresponds to an interior profile of the lens frame 1520. In certain exemplary embodiments, the lens 1525 may be installed in the reflector assembly 1517 by placing the lens 1525 on the top end of the reflector 1105, aligning the lens frame 1520 with the lens 1525 and the reflector 1105, and securing the clips 1520*b* of the lens frame 1520 to the tabs 1110 of the reflector 1105. In certain exemplary embodiments, the lens 1525 is configured to protect a lamp (not shown) or wiring (not shown) associated with the lighting fixture 100 (of FIG. 1) from damage due to environmental or other conditions, such as preventing water from contacting the lamp or wiring.

Although FIG. 15 depicts the lens frame 1520 and lens 1525 with a reflector 1105 having a tall square geometry, the lens frame 1520 and lens 1525 may be used with other reflectors (not shown) having other geometries. For example, each of the angle-cut reflector assembly 117 of FIG. 3 and the short square reflector assembly 917 of FIGS. 9 and 10 may be configured to include a lens frame 1520 and lens 1525, substantially as described previously in connection with the reflector assembly 1517 of FIG. 15.

Figure 16:
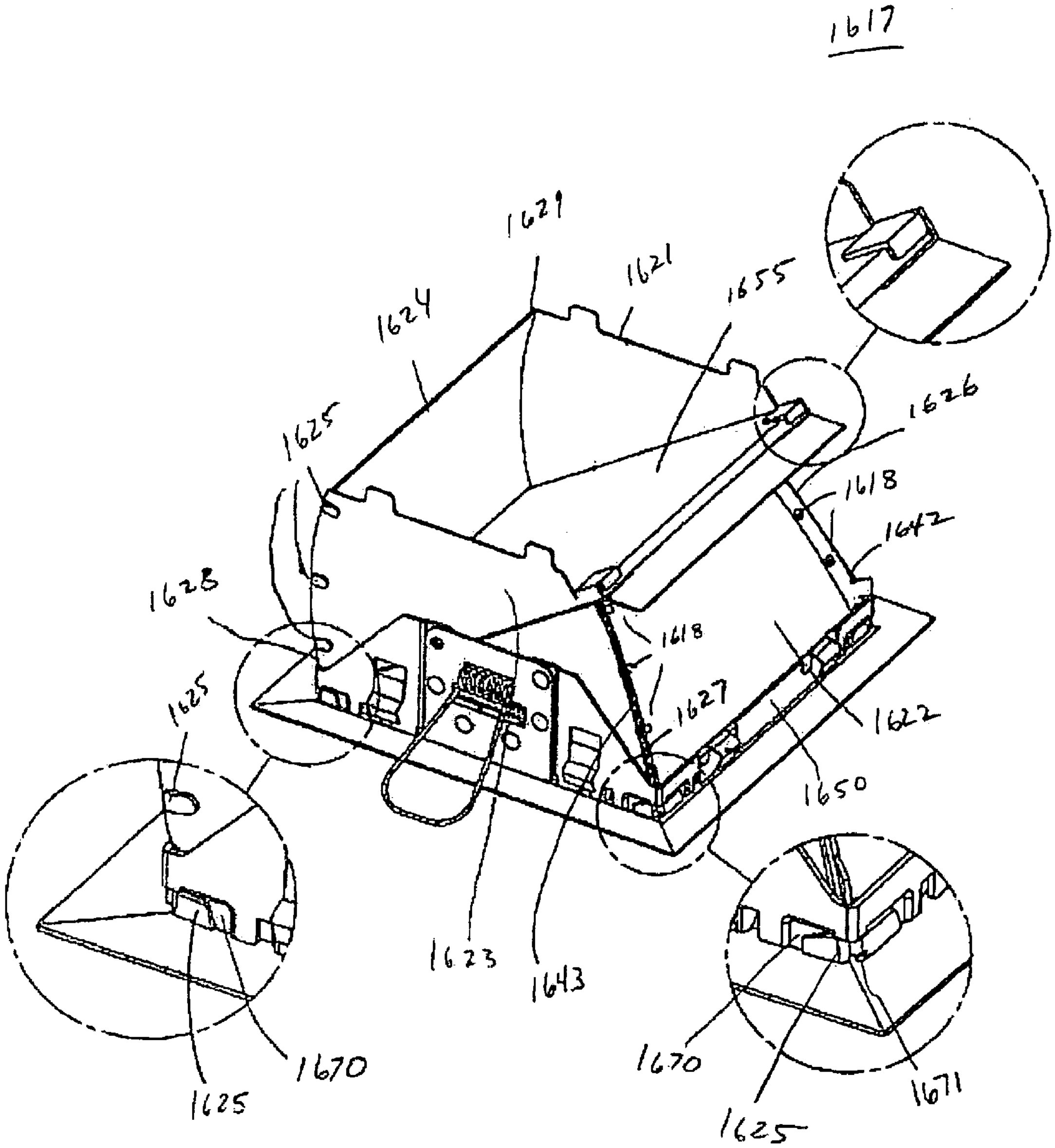
FIG. 16 is a perspective side view of yet another reflector assembly, in accordance with certain alternative exemplary embodiments.
Figure 17:
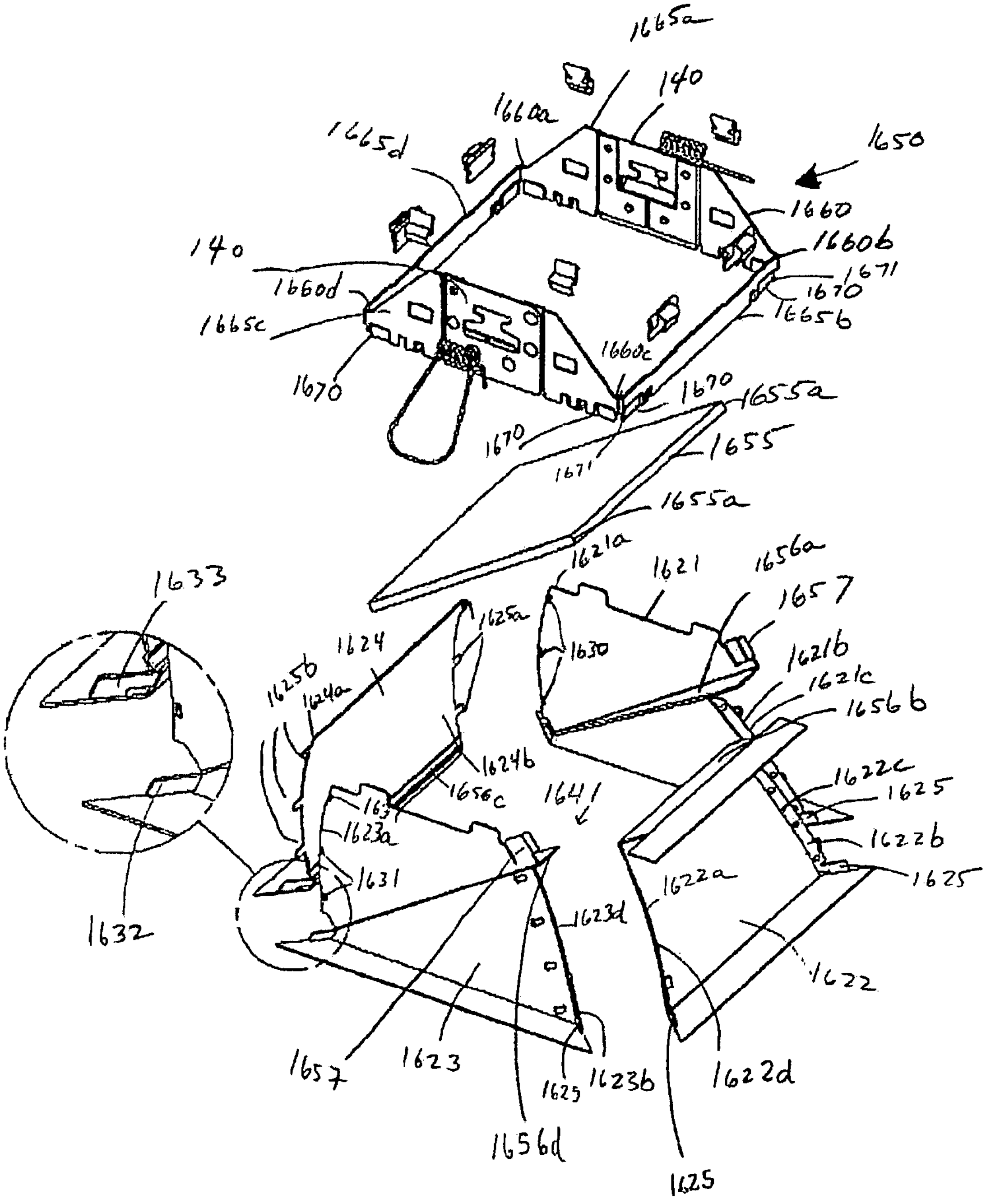
FIG. 17 is a perspective, exploded view of the alternative reflector assembly of FIG. 16, in accordance with certain exemplary embodiments.

FIGS. 16 and 17 illustrate a reflector assembly 1617, in accordance with certain alternative exemplary embodiments. With reference to FIGS. 16-17, the reflector assembly 1617 is similar to the reflector assembly 117 of FIG. 3, except that the reflector assembly 1617 has a different geometric shape than the reflector assembly 117 of FIG. 3 and includes fasteners 1618 and integral tabs 1625 in place of the integral clamps 325 (of FIG. 3) of the reflector assembly 117. The reflector assembly 117 of FIG. 3 is generally referred to as a "downlight" reflector assembly, and the reflector assembly 1617 is generally referred to as a "wall-wash" reflector assembly 1617.

Like the reflector assembly 117 of FIG. 3, the reflector assembly 1617 includes multiple members 1621-1624 coupled to one another at joints 1626-1629. A bracket assembly 1650 is disposed substantially around at least a portion of each member 1621-1624. As best seen in FIG. 17, member 1621 has a first end 1621*a* and a second end 1621*b*. The first end 1621*a* includes notches 1630 configured to receive tabs 1625*a* disposed on a second end 1624*b* of member 1624. For example, when the reflector assembly 1617 is assembled, the tabs 1625*a* are bent around the edges of the notches 1630 to secure the members 1621 and 1624 to one another.

The second end 1621*b* of the member 1621 includes a segment 1621*c* that extends in a direction away from a light dispersion region 1641 of the reflector assembly 1617. Similarly, a second end 1622*b* of the member 1622 includes a segment 1622*c* that extends in a direction away from the light dispersion region 1641. The segments 1621*c* and 1622*c* engage one another, with fasteners 1618 (FIG. 16) securing the segments 1621*c* and 1622*c* together. The segments 1621*c* and 1622*c* essentially create a "wing" 1642 that extends away from the light dispersion region 1641, towards the bracket assembly 1650. For example, fasteners 1618 can extend through aligned apertures in the segments 1621*c* and 1622*c* to secure the segments 1621*c* and 1622*c* together. In certain exemplary embodiments, the fasteners 1618 include, but are not limited to pins, clips, screws, bolts, nails, rivets, or other means for fastening known in the art.

As best seen in FIG. 17, a similar arrangement exists between a first end 1622*a* of the member 1622 and a second end 1623*b* of the member 1623. Specifically, the first end 1622*a* includes a segment 1622*d* that extends in a direction away from the light dispersion region 1641, and the second end 1623*b* includes a segment 1623*d* that extends in a direction away from the light dispersion region 1641. The segments 1622*d* and 1623*d* essentially create a "wing" 1643 that extends away from the light dispersion region 1641 and generally towards the bracket assembly 1650. For example, fasteners 1618 can extend through aligned apertures in the segments 1622*d* and 1623*d* to secure the segments 1622*d* and 1623*d* together.

Similar to the first end 1621*a* of the member 1621, a first end 1623*a* of the member 1623 includes notches 1631 configured to receive tabs 1625*b* disposed on a first end 1624*a* of the member 1624. For example, when the reflector assembly 1617 is assembled, the tabs 1625*b* are bent around edges of the notches 1631 to secure the members 1623 and 1624 to one another. In certain exemplary embodiments, one or more of the members 1621-1624 may include an integral corner tab 1632 configured to engage a corresponding notch 1633 of an adjacent member 1621-1624. For example, in certain exemplary embodiments, the corner tab 1632 is configured to be bent into the notch 1633 to secure the adjacent members 1623 and 1624 together.

A lens 1655 is positioned with the reflector 1605 by resting on support segments 1656*a*-1656*d* of the members 1621-1624. The lens 1655 includes a transparent or semi-transparent member. Integral tabs 1657 of the members 1621 and 1623 are configured to bend around corner edges 1655*a* of the lens 1655, to thereby secure the lens 1655 to the reflector 1605.

Similar to the bracket assembly 310 of FIG. 3, the bracket assembly 1650 of FIGS. 16 and 17 includes a frame 1660 and connectors 140. The frame 1660 can be formed as a single member, with no joints, or by joining together multiple members at one or more joints. The frame 1660 includes side segments 1665*a*-1665*d* disposed about at least a portion of the members 1621-1624, respectively, of the reflector 1605.

Each corner 1660*a*-1660*d* of the frame 1660 includes at least one pocket 1670 configured to receive a corresponding tab 1625. Each tab 1625 extends from one of the ends 1621*a*, 1623*a*, 1624*a*, and 1624*b* or one of the segments 1621*c*, 1622*c*, 1622*d*, and 1623*d*. For example, one or more of the tabs 1625 can be integral to its corresponding end 1621*a*, 1623*a*, 1624*a*, 1624*b* or segment 1621*c*, 1622*c*, 1622*d*, 1623*d*. Each tab 1625 is configured to be compressed around at least a portion of a corresponding joint 1626-1629 of the reflector 1605, such that at least a portion of the tab 1625 rests within a corresponding pocket 1670. In certain exemplary embodiments, at least one of the pockets 1625 includes a hook 1671 configured to engage the corresponding tab 1625. For example, the hook 1671 can be configured to retain the tab 1625 within the pocket 1670.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A reflector assembly, comprising:

a reflector comprising multiple members, pairs of adjacent members forming joints of the reflector, each member comprising at least one integral tab associated with one of the joints of the reflector; and a frame positioned around a periphery of the reflector, the frame comprising corners that correspond to and are disposed around the joints of the reflector, each corner comprising at least one pocket disposed in an outside edge of the frame, each integral tab extending around at least a portion of its associated joint and resting in one of the at least one pocket of the corner of the frame corresponding to the associated joint, thereby securing the frame to the reflector.

2. The reflector assembly of claim 1, wherein the reflector comprises four members arranged in a geometric form that defines a substantially rectangular opening.

3. The reflector assembly of claim 1, wherein at least one of the corners comprises a hook that retains one of the integral tabs in the pocket within which it is resting.

4. The reflector assembly of claim 1, further comprising a lens, and wherein each of the members of the reflector comprises a support segment, the support segments collectively defining a platform on which the lens rests.

5. The reflector assembly of claim 4, wherein at least one of the members of the reflector includes an integral retainer that extends around at least a portion of the lens to secure the lens to the reflector.

6. The reflector assembly of claim 4, wherein the lens forms an acute angle relative to an opening of the reflector.

7. The reflector assembly of claim 1, wherein the frame comprises at least one connector configured to couple the reflector assembly to a collar of a lighting fixture.

8. The reflector assembly of claim 7, wherein each connector comprises:

a biasing member; and a lever coupled to the biasing member.

9. The reflector assembly of claim 8, wherein the connector further comprises a resting tab configured to prevent the lever from contacting a flange of the reflector.

10. The reflector assembly of claim 8, wherein the biasing member comprises a torsion spring.

11. The reflector assembly of claim 1, wherein the frame further comprises at least one adjustment tab configured to be received in a notch of a lighting fixture to aid in alignment of the reflector assembly within the lighting fixture.

12. The reflector assembly of claim 1, wherein each of two of the joints comprises a wing formed from segments of corresponding adjacent members, each segment extending in a direction away from a light dispersion region of the reflector, wherein, for each wing, two of the integral tabs extend from the wing.

13. A reflector assembly, comprising:

a reflector comprising multiple members that define a light dispersion region, pairs of adjacent members forming joints of the reflector, at least two of the joints comprising a wing formed from outer segments of corresponding adjacent members, each of the outer segments extending in a direction away from the light dispersion region, each member of the reflector comprising:

at least one integral tab associated with one of the joints of the reflector; and an inner segment extending towards the light dispersion region, the inner segments collectively defining a platform;

a lens resting on the platform; and a frame positioned around a periphery of the reflector, the frame comprising corners that each correspond to and are disposed around at least a portion of one of the joints of the reflector, each integral tab extending around at least a portion of its associated joint and resting along an outside edge of the corner of the frame corresponding to the associated joint, thereby securing the frame to the reflector.

14. The reflector assembly of claim 13, wherein the lens forms an acute angle relative to an opening of the reflector.

15. The reflector assembly of claim 13, wherein at least one of the corners comprises a hook that retains one of the integral tabs in a pocket disposed in an outside edge of the frame, within which it is resting.

16. The reflector assembly of claim 13, wherein at least one of the members of the reflector includes an integral retainer that extends around at least a portion of the lens to secure the lens to the reflector.

17. The reflector assembly of claim 13, wherein for each joint, the adjacent members forming the joint each comprise one of the integral tabs.

18. A method of assembling a reflector assembly, comprising the steps of:

aligning a plurality of reflective members in a predetermined geometric form, pairs of adjacent reflective members forming joints of the predetermined geometric form, each reflective member comprising a plurality of integral fastening means, the plurality of integral fastening means comprising, for each reflective member, at least one integral tab;

positioning a frame around a periphery of the reflective members; and attaching the frame to the reflective members and the reflective members to one another by manipulating each of the fastening means, including, for each joint, bending at least one integral tab around at least a portion of the joint so that the integral tab rests along an outside edge of the frame.

19. The method of claim 18, further comprising installing a lens in the reflector assembly by:

placing the lens on a platform defined by segments of the reflective members, the segments extending inwardly, towards a light dispersion region of the reflector assembly; and securing the lens to the platform by bending at least one integral retainer of the reflective members around at least a portion of the lens.

20. The method of claim 18, wherein manipulating each of the fastening means further comprises bending at least one integral tab of a first of the reflective members around at least a portion of a corresponding notch of a second of the reflective members, the first of the reflective members disposed adjacent the second of the reflective members.

* * * * *